United States Patent
Friedrich et al.

(10) Patent No.: US 7,180,992 B2
(45) Date of Patent: Feb. 20, 2007

(54) METHOD AND DEVICE FOR PROVIDING CONFERENCES

(75) Inventors: Peter Friedrich, Petershagen (DE); Norbert Löbig, Darmstadt (DE)

(73) Assignee: Siemens Aktiengesellschaft, Munich (DE)

(*) Notice: Subject to any disclaimer, the term of this patent is extended or adjusted under 35 U.S.C. 154(b) by 726 days.

(21) Appl. No.: 10/644,079

(22) Filed: Aug. 20, 2003

(65) Prior Publication Data

US 2004/0218553 A1 Nov. 4, 2004

(30) Foreign Application Priority Data

Aug. 21, 2002 (DE) .............................. 102 38 286

(51) Int. Cl.
*H04M 3/42* (2006.01)

(52) U.S. Cl. ................................. 379/202.01

(58) Field of Classification Search ................................ 379/202.01–206.01, 88.01, 88.05; 709/202, 709/203; 370/260, 261; 704/246, 251
See application file for complete search history.

(56) References Cited

U.S. PATENT DOCUMENTS 5,373,549 A * 12/1994 Bales et al. ............... 379/93.21
6,353,662 B1    3/2002 Foladare et al.
7,058,168 B1 *  6/2006 Knappe et al. ........ 379/204.01

FOREIGN PATENT DOCUMENTS

| DE | 198 15 347 | 10/1999 |
|----|------------|---------|
| GB | 2 302 477  | 1/1997  |
| WO | WO 01/28214 | 4/2001 |

* cited by examiner

*Primary Examiner*—Benny Q. Tieu
(74) *Attorney, Agent, or Firm*—Morrison & Foerster LLP

(57) ABSTRACT

The invention provides assistance, by providing a control interface between a recognition or announcement/dialog function with voice recognition functionality and a conference management function, via which the conference can be controlled and monitored in an automated manner. The recognition or announcement/dialog function switches to the individual conferences in succession under the control of the conference management function, monitors the combined stream of all voice data emitted by the conferees in an interim check. If disruptive data is detected, the conference management function associates the disruptive data with the conferee emitting the data. The recognition or announcement/dialog function to the individual participants in the conference is switched in succession. If the conferee emitting the disruptive data is detected in this process and this conferee is identified as a disruptive party as a result, the conferee is automatically switched to silent or removed entirely from the conference.

16 Claims, 2 Drawing Sheets

METHOD AND DEVICE FOR PROVIDING CONFERENCES

CLAIM FOR PRIORITY

This application claims priority to German application Application No. 10238286.7 which was filed in the German language on Aug. 21, 2002, the contents of which is hereby incorporated by reference.

TECHNICAL FIELD OF THE INVENTION

The invention relates to a method and a device for providing conferences, and in particular, by providing a control interface between a recognition or announcement/dialog function and a conference management function.

BACKGROUND OF THE INVENTION

With the prior art, services for audio conferences are part of the essential range of services offered by voice switching networks. They are provided by the switching centers of the network or even by network elements external to the switching centers. The conference function here is based on a combined function for the audio stream of the participating conferees, which is provided by a specific hardware unit with DSP capacity (Digital Signal Processor).

In conventional cases, where the useful channel of a connection is fed to the switching center, the conference functions and the announcement and tone functions required for these can be provided by peripheral devices or external devices equipped with corresponding functionality. If, however, the useful data is conveyed outside the switching center in a packet network, preferably at least one external conference system is used for this. The system has interfaces with the packet network for the useful data of the conference. The useful data of the conference here is either the useful data of the individual conferees or the announcements/dialogs and tones to be input as well as the combined signal to be distributed to the conferees, which is generated via at least one conference bridge. The external conference system can also have a control interface with the switching center controlling connections in the packet network conveyed outside the switching center, in order to control the required basic functions during the conference or to initiate the interspersion of announcements/dialogs and tones generated in the external conference system for example.

Essentially conference services have a range of conference features, which can be differentiated and defined in respect of the initiation and control of the progress of the conference:

There are on the one hand conference features, with which users are included as participants by DIAL-IN (dialing of the conferee into the conference) or by DIAL-OUT (calling of the conferee out of the conference), i.e. the conference process is characterized by the availability of the conferees (e.g. by connecting participants to the conference or the departure of participants from the conference).

On the other hand, there are conference features which are characterized by the conference leader or the conferees of the controlled conferences. For example, conferees can be connected, switched to silent or disconnected from the conference by a conference leader by means of appropriate DSS1 signaling (ETSI ADD-ON conference) or via an additional graphic control system on a PC-type terminal. These conference features controlling the conference are often available to the Conference Service Operator, who can manage the conference resources in the network and monitor the conference service.

With regard to videoconferences, which are increasingly used in packet-based networks, the need for conference control is increased by the participating conferees, who increasingly wish to influence the image to be viewed. This includes the selection of one or more participants during the conference, voice-activated switching of the image to the conferees speaking at the time, simultaneous image availability for a certain number of conferees and the additional insertion of documents.

Conversely, existing conference solutions inform the participants currently in a conference about the inclusion of a further conferee in the conference or the fact that a conferee has left the conference by means of conference tones and/or by means of generally few conference announcements of corresponding content.

With regard to the initiation and control of conferences, the following distinction is made between conference services:

With the ETSI-ADD-ON conference, control is by definition only possible in a local switching center. It is initiated and controlled via conferee signaling (numerical sequence control). It is primarily available in TDM-based but also in packet-based networks, the switching centers of which support conventional participant signaling and can be initiated directly (AD HOC).

The PRESET conference represents a compromise between AD HOC initiation and a simultaneously predefined conferee list.

The PHONEMEET conference is offered as a general network service (public conference). This service, which is very similar to the internet chat service but is much longer established, provides a Service Code, which can be used to dial into a conference on a specific topic and have discussions with conferees who have already dialed into the topic. Conferees do not generally identify themselves and have no guarantee that they will be connected to a repeat joint conference when they dial in again. The characterizing feature of such a service is that participants, who generally do not know each other, can have discussions in the public network. No control by conferees is required, and automatic monitoring of disruptive parties is not available. Some network operators have operators to monitor conference availability and the undisrupted progress of the conference, the operators identifying and isolating hostile disruptive parties by sporadically listening in.

Pre-reserved conferences are available as DIAL-IN, DIAL-OUT or MIXED DIAL-IN/DIAL-OUT conferences. They are particularly useful for business customers. One disadvantage is that pre-reservation and conference planning have to be carried out manually and there is therefore no AD HOC availability.

For the purposes of completeness, reference should be made to conference services with Web-based operator interfaces (such as Siemens SURPASS WEBCONFER) and TERMINAL conferences, which are supported according to certain signaling standards. The former can be booked and controlled via internet access. The advantage of Web-based control with Status Display is limited by the disadvantage of internet access with the possible requirement of an additional terminal for the conference leader and lack of interaction with the conferees. TERMINAL conferences are for example conferences for audio, video and data, which depend on the terminal functions and are possible with the specifications of the H.323 Standard (or even the SIP Standard), with which conventional terminals cannot be used. A central bridge is superfluous here. Major conferences with a large number of participants are however not possible due to the limited performance of the terminals. A further disadvantage is the increased bandwidth requirement between conferees.

Resources have to be made available in the network for all conference services. As conference services represent a cost-intensive investment for network operators, they are not made available to an unlimited degree in the network. This means increased control costs; for as well as the interactions between the conference leader and the participants during the conference, the time and date of the conference have to be agreed, the availability of the conferees and the appropriate conference resources has to be established and participants have to be informed of the time and access authorization, to ensure the success of the conference.

Conferences which can be initiated on an AD HOC basis from experience have a control interface characterized by numerical sequence control of the telephony or a graphic control interface connected to a higher quality, intelligent, possibly additional, terminal, which set the limits for the sporadically immediate operability of any terminal. The system tones and announcements made available to the conferees only allow general conclusions about the progress and status of the conference. As far as pre-reserved conferences are concerned, in some circumstances significant manual interaction is required before the start of the conference. Such impediments make the deployment, use and success of conference solutions problematic.

SUMMARY OF THE INVENTION

The invention generally relates to simplified operation and control of conference services.

In one embodiment of the invention, there is a control interface provided between an announcement/dialog function and a conference management function, and a voice recognition functionality is provided. This considerably simplifies the preparation and operation/control of conference services. For example, the functional input via numerical sequences controlling the conference is no longer necessary, as the techniques based on the voice recognition functionality support a user-friendlier dialog between man and machine. Input can therefore be easily corrected by participants or operators. Essentially, operation is simplified for all currently known conference types in TDM and packet-based network environments, in particular for DIAL-IN, DIAL-OUT, MIXED DIAL-IN/OUT, ETSI ADD-ON, PHONE-MEET with/without operator monitoring, PRESET conference.

The conference functionality, in particular of conferences initiated on an AD HOC basis, is also decoupled from participant signaling and made available at remote level (i.e. more generally in further switching systems possibly belonging to competitor network operators). Additional devices with graphic operator interfaces are not necessary and operator input is minimized in respect of monitoring, booking and/or the procedural organization of conferences.

One advantage of the invention is the positive impact on conference services. The ETSI ADD-ON conference functionality is not only available and easy to operate in the local switching center, but also in any TDM-based or packet-based network through the use of techniques based on (DTMF) voice recognition, to overcome the restrictions of participant signaling. Techniques based on voice recognition are advantageously used, when compressive coding methods are used particularly in packet-based networks, which do not guarantee disruption-free DTMF transmission. Booking and management processes for conference services can also be automated using corresponding IVR logic (Interactive Voice Response), such as recognition of disruptive parties and intercept initiation and control of follow-up activities by voice recognition mechanisms.

BRIEF DESCRIPTION OF THE DRAWINGS

The invention is described in more detail below with reference to the drawings, in which.

DETAILED DESCRIPTION OF THE PREFERRED EMBODIMENTS

Figure 1:
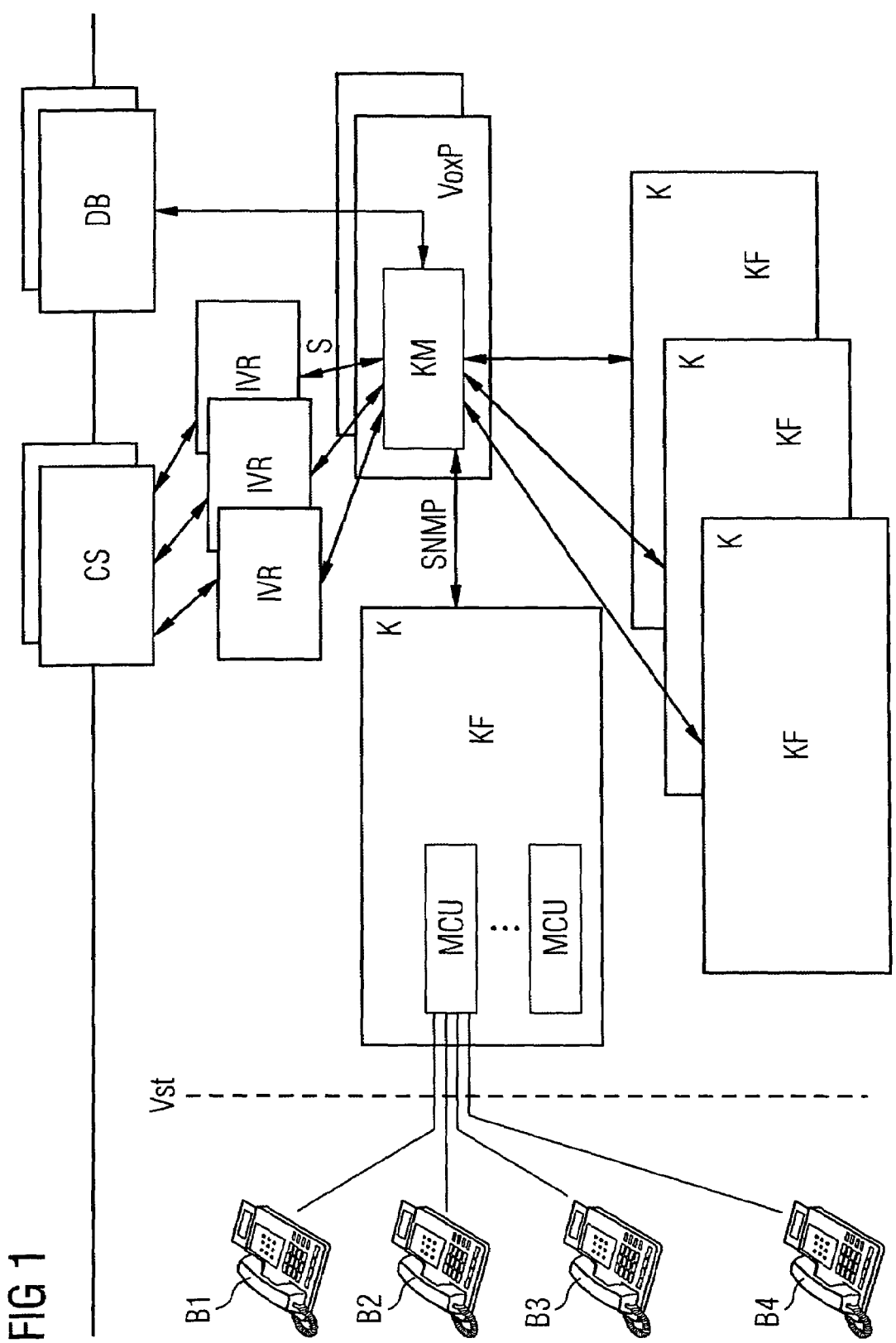
FIG. 1 shows the basic relationships in the network.

FIG. 1 shows the basic relationships according to the invention. In this embodiment, there is a public TDM-based or packet-based, in particular IP-based network, in which at least one announcement and dialog function IVR, one conference management function KM and at least one conference function KF are available in order to provide user-friendly conference services.

FIG. 1 also shows, for example, 4 users B1 to B4, who wish to take part in a conference. These 4 conferees are served and controlled by a switching system Vst. FIG. 1 also shows a number of mutually independent conference systems K, in which the conference function KF is operating. Interface devices MCU can also be seen to be part of a conference system and these should be seen as the ends of the useful data streams from and to the conferees.

The conferees' useful data is switched through under the control of the switching center Vst and fed to these interface devices MCU. The useful data streams are also combined here.

The conference function KF essentially represents a conventional combined function of multiple input signals for audio or video signals. It also supports the distribution function for further information as well. The platform to be provided for this is characterized by telephony interfaces for adaptation to the network and signaling as well as by DSP-based combined functions for the audio stream and where appropriate further functions for controlling video output (e.g. Voice Activated Video Switching).

Conference features such as DIAL-IN or DIAL-OUT are supported in conference connections by the conference function KF and their descriptive data is supplied via a control interface to a conference management function KM. The latter can intervene in a controlling manner at any time in the configuration of an ongoing conference via this interface. The SNMP protocol is used for example as the protocol between the conference management function KM and the conference system K.

There are conferees who are distinguished in that their input useful data stream is accessed before inclusion in the combined conference signal and fed to an announcement and dialog function IVR for a certain time for the purposes of monitoring for disruptive activity or to identify legitimate input controlling the conference (e.g. by the conference leader). An announcement and dialog function IVR can be permanently or temporarily assigned here via a control interface S between the announcement and dialog function IVR and the conference management function KM.

The announcement and dialog function IVR operates on at least one separate device or if necessary even collocated with the function KM described in more detail below on a device VoxP. It is used for dialog management with input recognition for the conference leader or the conferees, with DTMF input, menu-driven dialog or preferably keyword spotting in the natural dialog being used. The hardware platform required for the announcement and dialog function IVR is generally characterized due to the performance required in public networks by telephony interfaces, which undertake adaptation to the network technology and signaling, as well as by hardware and software, which carry out voice recognition tasks (e.g. DSPs, voice recognition algorithms).

The conference-specific dialog processes necessary for the announcement and dialog function IVR are stored appropriately on a content server CS, e.g. in the form of VoiceXML scripts, which are produced based on the conference configuration and give the complete dialog sequence for the IVR system.

FIG. 1 also shows a conference management function KM, which is configured as a software function and which operates on a device VoxP. This monitors and supports the status of the conference systems K and their ports generally and where necessary network-wide. A further functionality is the reservation of conferences booked in advance, the prompt activation and monitoring/control of the conferences themselves and the generation of charge tickets, in particular with regard to the reservation of resources in the network. Booking data and charge data and where necessary error indices as well as traffic and statistical data are stored on a database server DB by the conference management function KM.

According to one embodiment of the invention, the announcement and dialog function IVR has a control interface S with the conference management function KM, with which it is able to output booking data for a conference or the initial conference parameters of an AD HOC conference to the conference management function for further processing. Conversely, the announcement and dialog function IVR receives information where necessary about the resource requirement, which can be covered at present or for the intended booking period from the conference management function and where necessary charge information for configuring the dialog with the party ordering the conference/ the conference leader.

The conference management function has an overview of the availability of conference resources, if necessary network-wide, and can therefore in particular support and reserve conferences which extend over a number of conference systems (cascading) because of their size or in the event of resource shortages.

Finally, for reasons of fail-safety, the database server DB, content server CS, conference management function KM, announcement and dialog function IVR and the conference function KF are at least duplicated. The functions do not necessarily have to be set up on different hardware platforms. The IVR function and KM function in particular can be set up on different hardware platforms.

Figure 2:
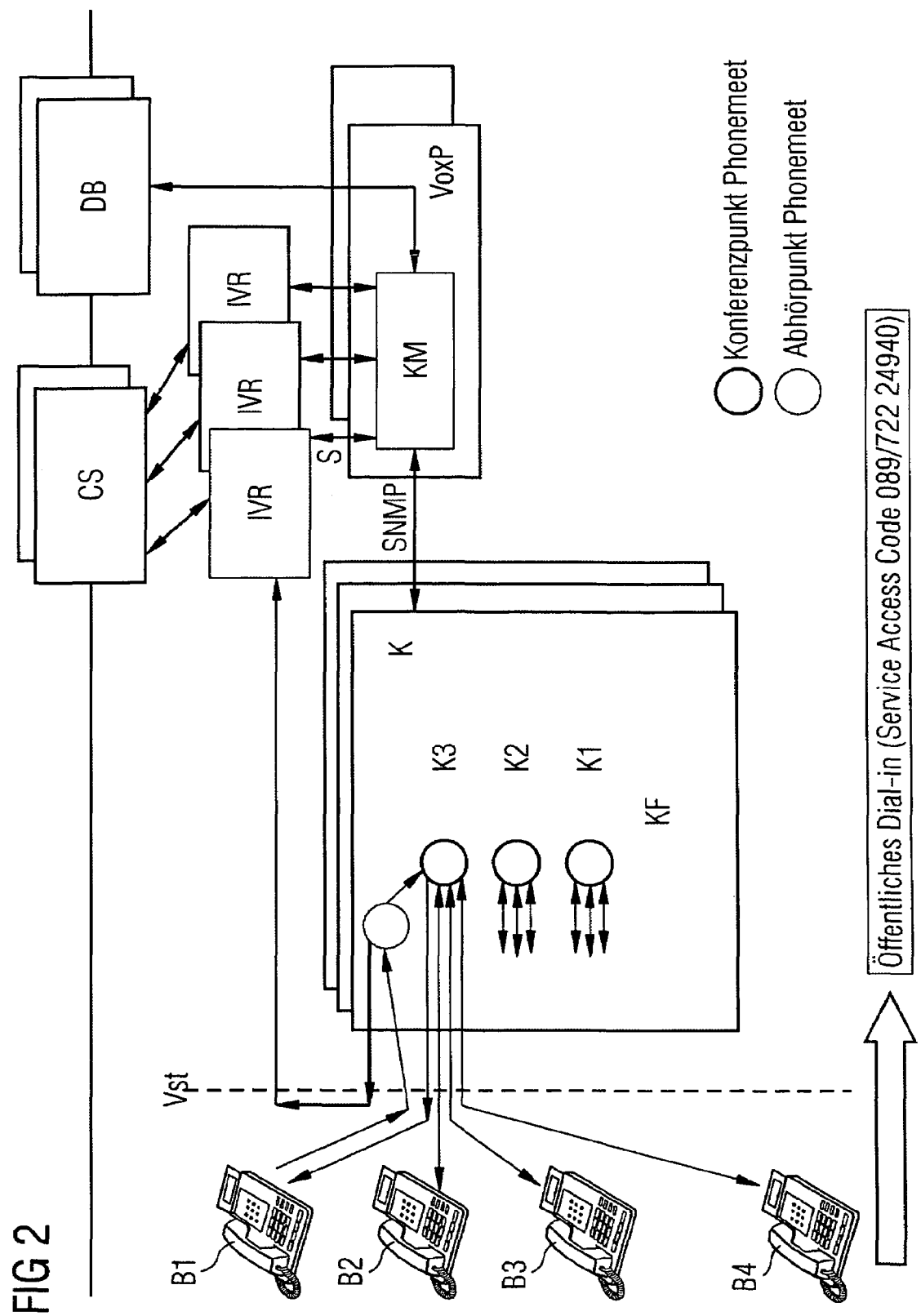
FIG. 2 shows the network elements and interfaces incorporated to eliminate disruptive parties in a conference.

FIG. 2 shows an application of the method according to the invention, where conferees emitting disruptive signals, hereafter referred to as disruptive parties, can be eliminated in an automated manner from a conference. This means that an automated operator operates in the place of a human operator. A PHONEMEET conference can for example be considered here. As this conference service is subject to charges, the network operator is concerned to ensure and monitor the availability of the service.

Automated operators are therefore preferably used. These preferably connect in succession to an ongoing PHONE-MEET conference, to verify that no disruptive parties are participating in the conference. The latter are typically characterized by the inputting of disruptive tones or by abusive language. Conferees disrupting in this way are then eliminated by the operator from the conference or at least switched to silent. Attempts will also be made to proceed in the same manner in the event of indecent contributions or even legally prohibited content.

In order that the operator can eliminate just the disruptive parties from the conference when such are identified, without having to disconnect the entire conference, the control unit of the conference system allows the operator to dial in or switch to the entire conference and to dial in or switch to each conferee in a PHONEMEET conference. This means that the operator is able to select the conference in question and thus locate a possible disruptive party.

FIG. 2 shows the network elements and interfaces required for this. The processes are preferably automated using voice recognition algorithms with key word spotting. In this way a recognition system or even an IVR system obtains access to PHONEMEET conferences in succession and monitors the conference (e.g. K1, K2, K3) first. If a disruptive party is identified on the basis of high sound levels, identification of abusive language by the voice recognition system or other criteria, the recognition system/ IVR system switches in succession to each individual conferee, to carry out a detailed check. The recognition system/ IVR system obtains the data for switching via the conference management system from the database DB, which includes the number of PHONEMEET conferences and their characteristics, such as maximum number of participants and accessibility for the monitor function. Switching can be achieved by dialing into the conference system K, as shown in FIG. 2 or via the control interface of the conference system. The conference system identifies from the signaling of the higher order switching center, e.g. from the A call number of the recognition system/IVR system or access via the control interface that this is a routine switch on the part of an operator function, which does not generate perceptible indices in respect of the conferees being checked or other conferees.

If a switch to a specific conferee is requested, the conferee's input stream into the conference is also forwarded to the recognition, system/IVR system. This is shown symbolically in FIG. 2 by the insertion of a further intercept point, which in some circumstances does not however reflect the actual hardware relationships. The switch to one conferee or the entire conference can be terminated via a command interface or by the recognition system/IVR system or the conference management system canceling the switch connection.

When an individual disruptive party is detected and identified, the recognition system/IVR system prompts the conference system to isolate it. This can take place preferably via the control interface of the conference system but can alternatively be achieved by appropriate dialing in to signal the wish to disconnect or silence a specific conferee. If the disruptive party is switched to silent, it can continue to listen to or watch the conference or alternatively an announcement can be played by the IVR system to clarify isolation status and the follow-up measures taken (switching to silent or disconnection from the conference). Expediently, the conference management system stores the data of the disruptive party (e.g. the A call number), as available, in a data storage unit, e.g. in the database of the content server CS.

The prompt by the monitor function to eliminate the disruptive party can be given via the operator interface of the VoxP device. Monitoring details are stored in the form of VoiceXML scripts on the content server CS. The VoiceXML pages including the conference points currently available and to be checked can be generated by the content server CS using the status parameters obtained from the database DB and supplied by the conference management function KM.

As an alternative for small network configurations with, for example, one conference server, the recognition/IVR/conference management function can also operate on the conference server itself.

In the above application the IVR system is used as a recognition system. If clarifying announcements are to be played to the isolated participants, a recognition system with announcement functionality is preferably used. The availability of a full interactive recognition and response function, in other words full IVR functionality, is required if the disruptive party, when switched to silent, is to be offered a dialog offering a range of different options (e.g. complaint function, etc.).

What is claimed is:

1. A method for eliminating disruptive parties from conferences, with at least one recognition function and at least one conference function, comprising:
    providing a conference management function, which accesses ongoing conferences in succession, with a combined stream comprising voice information of participants in at least one of the conferences being subjected by a recognition function to a first check for disruptive data;
    if disruptive data is detected in the combined stream by the conference management function, associating identified disruptive data with the participant emitting the disruptive data, by accessing the voice data of the participants in the conference being disrupted in succession and the recognition function subjecting the associated voice data stream to a second check for the disruptive data; and
    in the event of one of the participants being identified as a disruptive party, the disruptive party is isolated from the conference.

2. The method according to claim 1, wherein current characteristic data of conferences and participants is stored in a database, is updated further to a prompt by the conference functions or is retrieved to a prompt from the recognition functions.

3. The method according to claim 1, wherein the recognition functions are provided with a voice recognition function.

4. The method according to claim 1, wherein the disruptive data is detected based on disruption criteria, which is configured as increased sound levels, inputting of disruptive tones, abusive language recognized by the voice recognition system or indecent contributions or legally prohibited content.

5. The method according to claim 1, wherein switching to a specific conference or a specific participant is effected by the recognition system dialing into a relevant conference system or by direct control of the conference system by the conference management function, such that the data stream of the conference resulting from combination or the incoming data stream of the specific participant to the conference function is forwarded to the recognition function.

6. The method according to claim 1, wherein monitoring details formed as VoiceXML scripts are stored on at least one content server accessible to the recognition systems.

7. The method according to claim 6, wherein VoiceXML pages including conference points currently available and to be checked are generated by the content server using status parameters obtained from a database and made available to the recognition systems requesting them.

8. The method according to claim 1, wherein a participant detected as a disruptive party is isolated by switching to silent or removal from the conference under the control of the conference management function.

9. The method according to claim 2, wherein the conference management function stores data of identified disruptive parties and associated indices for nature and duration of the disruption and measures taken for remedial action in the database.

10. The method according to claim 1, wherein the conference management function has comprehensive knowledge of availability of the conference function and the recognition function and initiates disruptive party monitoring accordingly.

11. The method according to claim 1, wherein the conference management function, the recognition function and the conference function are at least duplicated on at least two different hardware platforms.

12. The method according to claim 1, wherein the conference management function can intervene at any time in the control of a conference and can activate the recognition function routinely and on operator command for disruption monitoring.

13. The method according to claim 1, wherein the conference management function uses a recognition function, which at the same time provides announcement and dialog functions, to inform the disruptive party about the reason for isolation or to offer a range of possible alternatives.

14. The method according to claim 1, wherein for network configurations with one or two conference servers, the recognition function/conference management function also operate on the conference system.

15. The method according to claim 1, wherein the first check is omitted and the voice data of the participants is accessed directly in succession and the voice data stream is checked for disruptive data by the recognition functions.

16. A device for eliminating disruptive parties from conferences, with at least one recognition function and at least one conference function, which operate on at least one conference system, comprising a control interface provided between the recognition function and a conference management function, via which the conference management function initiates and controls monitoring for disruptive parties in at least one conference, provides the conference data and receives a result of the monitoring for disruptive parties to initiate measures to eliminate disruptive parties.

* * * * *